H. FRYMAN.
SIGNAL FOR VEHICLES.
APPLICATION FILED OCT. 23, 1916.

1,265,317.

Patented May 7, 1918.

Inventor
Harry Fryman
by Herbert W. Jenner
Attorney

UNITED STATES PATENT OFFICE.

HARRY FRYMAN, OF GREAT GRIMSBY, ENGLAND.

SIGNAL FOR VEHICLES.

1,265,317.

Specification of Letters Patent.

Patented May 7, 1918.

Application filed October 23, 1916. Serial No. 127,169.

*To all whom it may concern:*

Be it known that I, HARRY FRYMAN, a subject of the King of Great Britain, residing at Great Grimsby, in the county of Lincoln, England, have invented certain new and useful Improvements in Signals for Vehicles; and I do hereby declare the following to be a full, clear, and exact description of the invention, such as will enable others skilled in the art to which it appertains to make and use the same.

This invention relates to improvements in that type of direction indicators for use on vehicles, which consists of a pointer adapted to be turned by the driver or rider of the vehicle to point in the direction which will indicate to pedestrians and others the direction in which the vehicle is going to proceed, the pointer of indicators of this type being in some cases hollow and illuminated by an electric lamp or lamps or other artificial light, inside the same, and in other cases being solid and provided with a lamp applied to the point end.

According to my invention, I employ an indicator preferably of arrow-like shape especially designed for use with bicycles, tricycles and the like and adapted to be mounted, according to a preferred mode, on the handle-bar thereof, the pointer or indicator proper being operated by a handle or hand-wheel fixed on the spindle of the indicator itself, the indicator being adapted to be turned to three distinct positions, the one position being vertical indicating that the bicycle or the like is to proceed straight forward, the second pointing to the right, indicating that the bicycle or the like is to turn in that direction, and the third pointing to the left, indicating that the bicycle or the like is to turn in that direction; my improvements consisting of the means for locking the pointer or indicator in the position to which it is turned; of the combination and arrangement of the parts comprising the apparatus, and according to a modification, of the special construction of the pointer and means for illuminating it.

Figure 1:
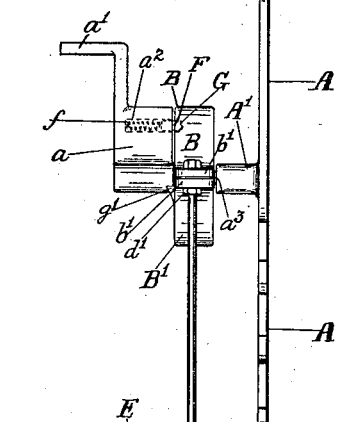
Figure 2:
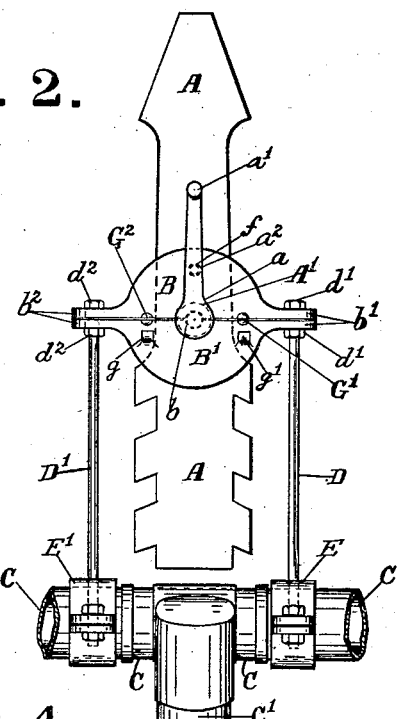
Figure 3:
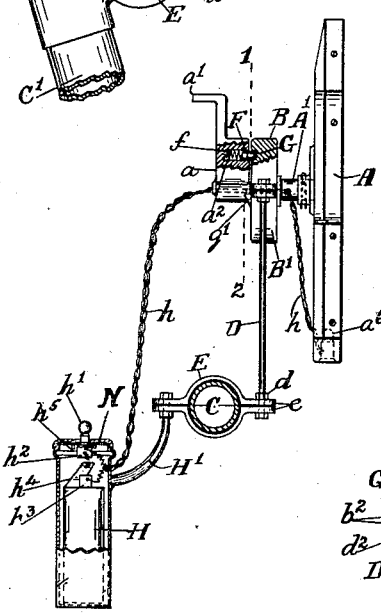
Figure 4:
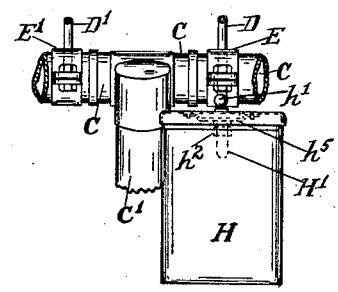
Figure 5:
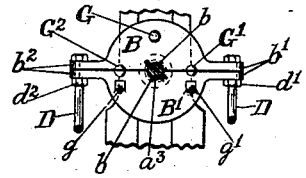
Figure 6:
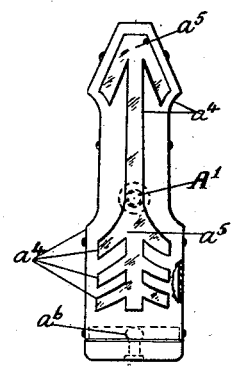

In order that my invention may be readily understood and carried into effect, I have appended hereunto a sheet of explanatory drawings of which Figure 1 is a side view of my indicating apparatus shown mounted on the handle-bar of a bicycle, Fig. 2 is a back view of same, Fig. 3 is a similar view to Fig. 1 but shows the indicator in the form of a box or casing fitted with a small electric lamp and also shows the battery or the equivalent for supplying the electric current to the lamp and the wires connecting the battery or the like with the lamp, parts of the apparatus being shown in section. Fig. 4 represents a back view of a portion of a bicycle head and handle-bars and shows the electric battery or the like mounted on the handle-bars, Fig. 5 is a section on the line 1—2 of Fig. 3, but showing only a portion of the indicator and the supporting rods, and Fig. 6 is a front view of the indicator illustrated at Fig. 3 showing the representation of an arrow cut or stamped out of the front and provided with a piece of glass or other transparent or semi-transparent material to form a backing for the cut out or like design when the indicator is to be illuminated. Figs. 3 to 6 inclusive are drawn to a smaller scale than Figs. 1 and 2.

Referring to the drawing, A is the indicator shown as of arrow shape, $A^1$ being the spindle provided with a flat enlargement $a$ and a crank-like handle $a^1$ on its outer end, the indicator being mounted on or suitably secured to the front end of the said spindle.

The spindle $A^1$ is rotatably mounted in a bearing consisting of two similarly shaped pieces B, $B^1$ each having a semi-circular recess at the center, which recesses between them form a hole $b$, the spindle being reduced as indicated at $a^3$ to fit the said hole whereby longitudinal movement of the spindle and of the indicator is prevented; any other suitable means for preventing longitudinal movement of the spindle in its bearing may however be adopted.

The bearing, and consequently the indicator, is mounted in any suitable position and in any suitable manner in front of the rider of the bicycle or the like, the accompanying drawing showing it supported on the handle-bars C by means of two rods D, $D^1$ carried by two clips E, $E^1$ which embrace the handle-bars one at each side of the front pillar $C^1$, the bottom end of the rod D passing through holes in ears $e$, $e$ on one end of the two portions which form the clip E and being secured to such clip by means of nuts $d$, $d$ turned on the screw-threaded end of the rod the one into contact with the top ear and the other into contact with the bottom ear of such clip, its top end passing through holes in ears $b^1$, $b^1$ on the bearing, which bearing is secured to the said rod by means of nuts $d^1$, $d^1$, the bottom end of the rod $D^1$ being similarly passed through holes in ears on the clip $E^1$ which correspond with the ears $e$, $e$ on the clip E, and being secured to the clip by nuts as before described with reference to the rod D, and its top passed through holes in other ears $b^2$, $b^2$ on the bearing which is also secured to such rod by means of nuts $d^2$, $d^2$. With this arrangement the bottom ends of the rods with the nuts thereon constitute a part of the means for securing the clips E, $E^1$ on the handle-bars and the top ends of such rods with the nuts thereon constitute the means for securing the two pieces B, $B^1$ together to form the bearing for the indicator spindle.

In the enlargement $a$ of the spindle $A^1$ is a hole $a^2$ which extends from the back of the enlargement for a suitable distance into such enlargement, and mounted in such hole is a loose bolt F which is backed by a spring $f$, and in the back face of the bearing B, $B^1$ are three recesses G, $G^1$ and $G^2$, one or other of which recesses the bolt F enters when the indicator is rotated to the point to give the required signal, so locking the indicator in such position, the bolt engaging the recess G when the indicator is in its normal position, that is, pointing upwardly to indicate that the rider intends to proceed straight forward, the said bolt engaging the recess $G^1$ when the indicator is turned to point in a right hand direction to indicate that the rider intends to turn to the right, and engaging the recess $G^2$ when the indicator is turned to point in a left hand direction to indicate that the rider intends to turn to the left.

The back of the bearing may be provided with two stops $g$, $g^1$ with which one or other side of the enlargement $a$ of the spindle $A^1$ would come into contact on the spindle being turned to turn the indicator in the direction to indicate that the rider intends to turn to the right or to the left, said stops preventing the spindle and consequently the indicator also, from being turned too far around.

The indicator may be formed out of a suitably strong flat piece of metal, wood or other suitable material, as illustrated at Figs. 1 and 2 of the drawing, or it may be cast or formed out of a plurality of pieces of metal, aluminium by preference, so fitted and secured together as to provide a hollow interior in which is fitted a small electric lamp for lighting the interior, the front portion of the indicator having the representation of an arrow or other suitable device cut or stamped out of it whereby the light would be discernible to observers at night or in dull weather.

An indicator of this type with means for supplying electric current to the lamp is illustrated at Figs. 3 to 6 inclusive of the accompanying drawing, $a^4$ indicating the representation of an arrow cut or stamped out of the front portion of the indicator, $a^5$ a piece of glass or other transparent or semi-transparent material fitted inside the indicator to form a backing for the cut or stamped out design, $a^6$ the electric lamp for illuminating the indicator. H indicates a battery or the equivalent for supplying electric current to the lamp, such battery or the like being shown secured to one of the clips on the handle-bars by means of an arm $H^1$, and $h$ are the wires which connect the battery or the like with lamp $a^5$.

The battery or the like is provided with a switch $h^1$ of any approved construction having a contact piece $h^2$ to which is connected one current wire, the other current wire being connected to a terminal $h^3$ on the battery or the like, a contact strip $h^4$ being situated between the contact $h^2$ and the terminal $h^3$ whereby on the switch being moved to the required position the circuit is completed and the current flows to the lamp. A bent spring $h^5$ is so mounted on the stem of the switch as to press on the inside face of the removable top of the battery or like casing, to hold the switch in the position to which it is moved.

The switch $h^1$ and its contact piece $h^2$ are slidable vertically in a hole in the cover N of the battery casing, and the strip $h^4$ is preferably of spring metal and is constantly in circuit with the battery terminal $h^3$. When the switch is raised, as shown in Fig. 3, the circuit is interrupted, and when the switch is pushed down so that its contact piece bears on the strip the circuit is closed and the lamp is lighted.

I claim:—

1. In a direction indicator, a supporting bearing plate formed of two superposed parts, means for securing the said parts together and to a vehicle, a shaft having a reduced middle portion which is journaled in the bearing plate, said shaft having an enlargement on one end portion, a spring catch bolt slidable in a hole in the said enlargement and adapted to engage with holes in the said bearing plate so as to hold the shaft in various predetermined positions, and a pointer secured on the other end portion of the shaft from the said enlargement.

2. In a direction indicator, a steering pillar provided with a handle bar, clips secured to the handle bar and arranged one on each side of the steering pillar, two rods projecting upwardly from the said clips and arranged in front of the handle bar, a bearing plate secured between the upper ends of the said rods, a shaft journaled in the bearing plate and arranged in the same vertical plane as the steering pillar, means for retaining the shaft in various predetermined positions, and a pointer secured on the front end portion of the said shaft.

3. In a direction indicator, a steering pillar provided with a handle bar, clips secured to the handle bar and arranged one on each side of the steering pillar, two rods projecting upwardly from the said clips and arranged in front of the handle bar, a bearing plate secured between the upper ends of the said rods, a hollow shaft journaled in the bearing plate and arranged in the same vertical plane as the steering pillar, means for retaining the shaft in various predetermined positions, a hollow pointer secured on the said shaft, an electric battery supported by the handle bar and arranged below it, an electric lamp inclosed in the hollow pointer, and wires passing through the hollow shaft and connecting the battery with the lamp.

In testimony whereof I affix my signature, in presence of two witnesses.

HARRY FRYMAN.

Witnesses:
LOUIS EDGAR KIPPAX,
FRED HAROLD RHODES.

Copies of this patent may be obtained for five cents each, by addressing the "Commissioner of Patents, Washington, D. C."